US012580764B2

(12) United States Patent
Huang et al.

(10) Patent No.: US 12,580,764 B2
(45) Date of Patent: Mar. 17, 2026

(54) PROCESSOR AND OPERATING METHOD FOR A HOMOGENEOUS DUAL COMPUTING SYSTEM

(71) Applicant: Shanghai Zhaoxin Semiconductor Co., Ltd., Shanghai (CN)

(72) Inventors: Zhenhua Huang, Beijing (CN); Yingbing Guan, Shanghai (CN); Yanting Li, Beijing (CN); Gangru Xue, Beijing (CN); Mingxiu Li, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 233 days.

(21) Appl. No.: 18/461,780

(22) Filed: Sep. 6, 2023

(65) Prior Publication Data

US 2024/0179001 A1 May 30, 2024

(30) Foreign Application Priority Data

Nov. 25, 2022 (CN) .......................... 202211490769.7

(51) Int. Cl.
*H04L 9/32* (2006.01)
(52) U.S. Cl.
CPC .............. *H04L 9/32* (2013.01); *H04L 9/3234* (2013.01)
(58) Field of Classification Search
CPC ................................ H04L 9/32; H04L 9/3234
See application file for complete search history.

(56) References Cited

U.S. PATENT DOCUMENTS

| | | | |
|---|---|---|---|
| 8,145,902 B2 | 3/2012 | Hatakeyama | |
| 11,501,024 B2 | 11/2022 | Anderson | |
| 2004/0078590 A1 | 4/2004 | Ellison | |
| 2004/0158681 A1 | 8/2004 | Hooker | |
| 2008/0162873 A1* | 7/2008 | Zimmer | G06F 9/4405 712/22 |

(Continued)

FOREIGN PATENT DOCUMENTS

| | | | |
|---|---|---|---|
| CN | 111221775 A | 6/2020 | |
| CN | 115269456 A * | 11/2022 | G06F 9/544 |

(Continued)

OTHER PUBLICATIONS

Notice of Allowance dated Dec. 13, 2024, issued in U.S. Appl. No. 18/467,901.

(Continued)

*Primary Examiner* — Jayesh M Jhaveri
(74) *Attorney, Agent, or Firm* — McClure, Qualey & Rodack, LLP

(57) ABSTRACT

A processor for building a homogeneous dual computing system is shown. The processor provides two homogeneous cores. One is used as a trusted core and the other is used as a master core. The trusted core has an access right to an isolated storage space of a system memory. The master core is a normal core that is prohibited from accessing the isolated storage space. The trusted core has a first cryptographic module. In response to a reset of the trusted core, the first cryptographic module operates for firmware verification. This is how the trusted core turns on the processor using trusted firmware.

20 Claims, 7 Drawing Sheets

(56)                     References Cited

U.S. PATENT DOCUMENTS

| | | | |
|---|---|---|---|
| 2012/0173877 A1* | 7/2012 | Pendakur | H04N 21/4408 |
| | | | 713/169 |
| 2013/0007325 A1 | 1/2013 | Sahita | |
| 2016/0283411 A1* | 9/2016 | Sheller | G06F 21/57 |
| 2018/0096136 A1 | 4/2018 | LeMay | |
| 2018/0285291 A1 | 10/2018 | Schulz | |
| 2020/0310972 A1* | 10/2020 | Shanbhogue | G06F 21/79 |
| 2021/0224061 A1* | 7/2021 | Pillilli | G06F 8/656 |
| 2023/0031974 A1* | 2/2023 | Suryanarayana | G06F 21/575 |
| 2023/0342503 A1 | 10/2023 | Zhao | |
| 2024/0248702 A1* | 7/2024 | Nachimuthu | G06F 8/65 |

FOREIGN PATENT DOCUMENTS

| | | | | |
|---|---|---|---|---|
| CN | 115905099 A | 4/2023 | | |
| KR | 20140113605 A | * 9/2014 | | G06F 9/30 |

OTHER PUBLICATIONS

Non-Final Office Action issued in U.S. Appl. No. 18/189,373, filed Mar. 24, 2023, mailed Apr. 21, 2025.
Non-Final Office Action issued in U.S. Appl. No. 18/189,381, filed Mar. 24, 2023, mailed May 30, 2025.
Ex Parte Quayle Action dated Jan. 31, 2024, issued in application No. U.S. Appl. No. 18/048,535.
Notice of Allowance dated Aug. 22, 2025, issued in U.S. Appl. No. 18/189,373.
Final Office Action dated Oct. 28, 2025, issued in U.S. Appl. No. 18/189,381.

* cited by examiner

PROCESSOR AND OPERATING METHOD FOR A HOMOGENEOUS DUAL COMPUTING SYSTEM

CROSS REFERENCE TO RELATED APPLICATIONS

This application claims priority of China Patent Application No. 202211490769.7, filed on Nov. 25, 2022, the entirety of which is incorporated by reference herein.

BACKGROUND

Technical Field

The present disclosure relates to trusted computing.

Description of the Related Art

Trusted computing improves computing security by hardware division. For example, a computer's system memory may be partitioned to provide an isolated storage space. Only an authorized, trusted platform is permitted to access it.

How to construct a computer that provides trusted computing, and how to securely start the computer, are important issues in this technical field. In this computer architecture, the communication technology linking trusted computing and normal computing is also the focus of this design.

BRIEF SUMMARY

A homogeneous dual computing system is shown. The homogeneous dual computing system uses two homogeneous cores within the same processor to provide trusted computing and normal computing. In the proposed processor with multiple cores, one core is selected as a trusted core, and the other cores are known as normal cores. In this architecture, trusted computing is achieved without additional peripherals or any exclusive core design. A simple trusted computing solution is proposed.

The processor may be a single-die processor or a multi-die processor. Secure booting and secure interrupt are further introduced to guarantee the security of trusted computing.

A processor in accordance with an exemplary embodiment of the disclosure includes a trusted core and a master core. The trusted core has an access right to an isolated storage space of a system memory. The master core is homogeneous with the trusted core. The master core is a normal core that is prohibited from accessing the isolated storage space. The trusted core has a first cryptographic module. In response to a reset of the trusted core, the first cryptographic module operates for firmware verification. This is how the trusted core starts up the processor using trusted firmware.

In an exemplary embodiment, the trusted core operates the first cryptographic module to perform firmware signature verification to authenticate and run the trusted firmware. The trusted core also operates the first cryptographic module to perform basic input and output system verification, to authenticate a trusted basic input and output system. The trusted core then wakes up the master core. Thus, the master core awakened by the trusted core runs the trusted basic input and output system.

In an exemplary embodiment, after waking up the master core to run the trusted basic input and output system, the trusted core enters a sleep state. The trusted core in the sleep state is awakened by the master core again after the master core running the trusted basic input and output system establishes a link between sockets or dies. After being awakened by the master core, the trusted core runs the trusted firmware to operate the first cryptographic module to perform operating system verification on an operating system loaded on the trusted core, to authenticate and run a trusted operating system.

In an exemplary embodiment, after being awakened by the master core to run the trusted firmware, the trusted core informs that the master core has learned the links between sockets or dies. In response to being informed by the trusted core, the master core runs the trusted basic input and output system to operate a second cryptographic module in the master core to perform operating system verification on an operating system that is loaded onto the master core, to authenticate and run a host operating system.

In an exemplary embodiment, the trusted core issues a secure inter-processor interrupt to safely wake up the master core to run the trusted basic input and output system. After running the trusted basic input and output system to establish a link between sockets or dies, the master core issues a secure inter-processor interrupt to safely wake up the trusted core to run the trusted firmware. The trusted core issues a secure inter-processor interrupt to inform that the master core has learned the link between sockets or dies.

In an exemplary embodiment, the trusted core running the trusted operating system and the normal core running the host operating system communicate with each other by accessing the shared storage space of the system memory through secure inter-processor interrupts.

In an exemplary embodiment, the processor further has an interrupt processing module. Based on the type of interrupt, the interrupt processing module blocks or unblocks all interrupts that the normal cores issue to the trusted core. The interrupt processing module unblocks point-to-point secure inter-processor interrupts, and multi-core synchronized external interrupts.

In an exemplary embodiment, unnecessary local internal interrupts of the trusted core are blocked by the interrupt processing module.

In an exemplary embodiment, the processor further has a model-specific register (MSR), which is programmed when the processor starts up, to make sure that each bit of the model-specific register corresponds to one interrupt type to indicate whether to block or unblock the interrupts of the corresponding interrupt type.

In an exemplary embodiment, the processor is a single-die processor, wherein the master core and the trusted core are provided on the same die.

In an exemplary embodiment, the processor is a multi-die processor including a first die as well as dies other than the first die. The first die is temporarily planned to provide the trusted core and the master core, so that on the first die the master core runs the trusted basic input and output system for link establishment. As for the dies other than the first die, each die is temporarily planned to provide an on-die trusted core and an on-die master core. Each on-die trusted core performs firmware verification and runs verified firmware to perform basic input and output system verification, and each on-die master core runs a verified basic input and output system for link establishment. After being linked together, all dies are unified to provide a system trusted core and a system master core, wherein a trusted operating system is loaded onto the system trusted core and run by the system trusted core, and a host operating system is loaded onto the system master core and run by the system master core.

Based on the aforementioned concept, a method for operating a homogeneous dual computing system is proposed. The method comprises the following steps. A processor is planned. The processor has multiple cores to provide a trusted core. The trusted core has an access right to an isolated storage space of a system memory. A master core is homogeneous with the trusted core. The master core is a normal core that is prohibited from accessing the isolated storage space. When the trusted core is reset, the first cryptographic module of the trusted core operates for firmware verification. This is how the trusted core turns on the processor using trusted firmware.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is made for the purpose of illustrating the general principles of the disclosure and should not be taken in a limiting sense. The scope of the disclosure is best determined by reference to the appended claims.

Figure 1:
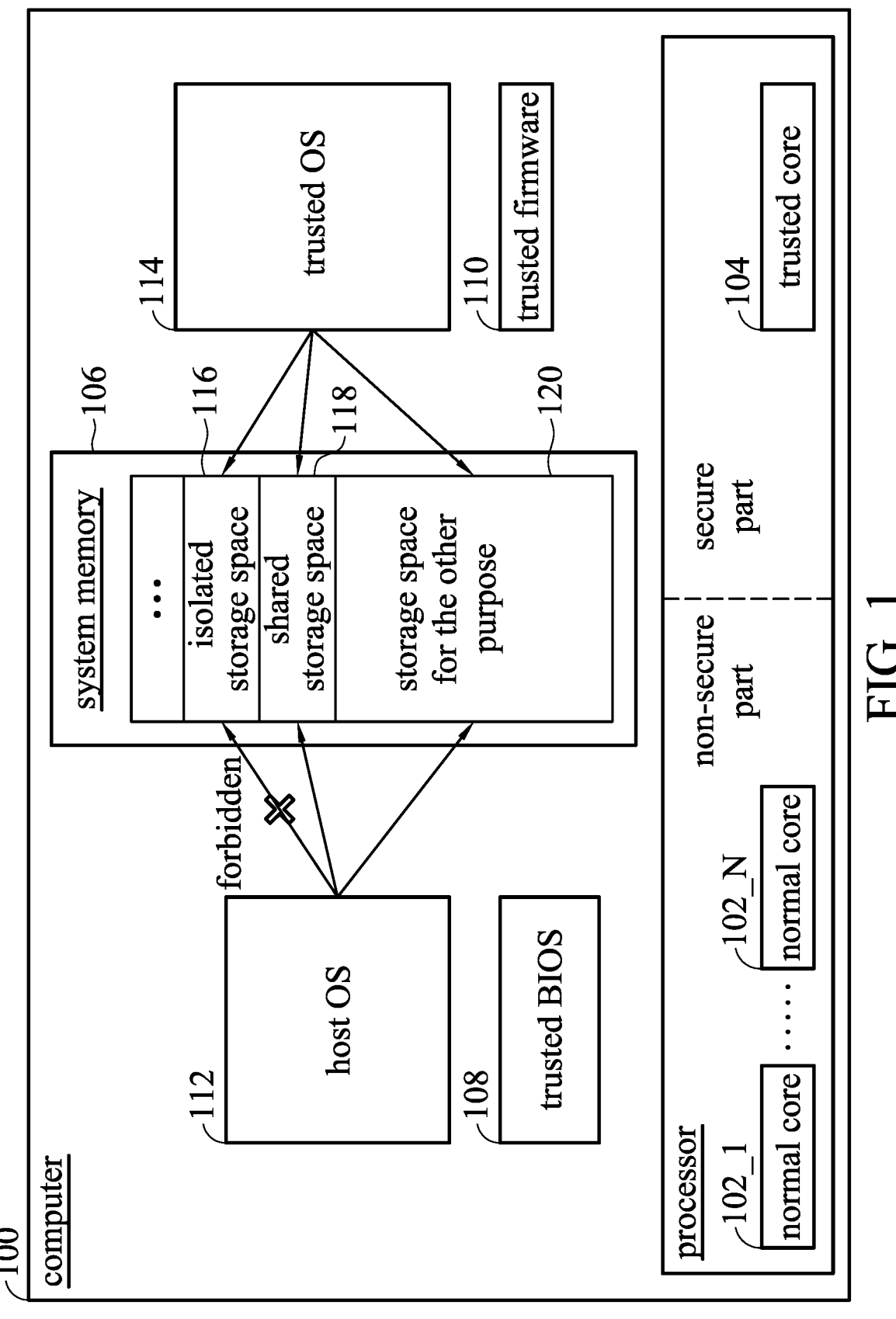
FIG. 1 illustrates the concept of an isolated storage space.

FIG. 1 illustrates the concept of an isolated storage space. A computer 100 with trusted computing capability includes a plurality of normal cores 102_1~102_N (N is a number), a trusted core 104, and a system memory (such as dynamic random access memory DRAM . . . etc.) 106. Corresponding to the hardware architecture, the computer 100 runs a trusted basic input output system (trusted BIOS) 108 and a trusted firmware 110. One of the cores 102_1 . . . 102_N is selected as a master core, which works as a boot strap processor (BSP for short) to load and run a host operating system (host OS) 112. The trusted core 104 runs a trusted operating system (trusted OS) 114. The system memory 106 is partitioned to provide an isolated storage space 116, a shared storage space 118, and a storage space 120 for the other purpose. As shown, the isolated data stored in the isolated memory 116 is accessible to the trusted operating system 114 but is prohibited from being accessed by the host operating system 112. The master cores (one of the normal cores 102_1 . . . 102_N) running the host operating system 112 can communicate with the trusted core 104 through the shared storage space 118. The storage space 120 is planned for the internal calculations of the normal cores 102_1 . . . 102_N. In some situations (for example, read only without writing), the trusted core 104 may also use the storage space 120 for internal calculations.

In particular, the normal cores 102_1 . . . 102_N, and the trusted core 104 proposed in the disclosure are the different cores of the same processor. The computer system constructed in this way is called a homogeneous dual computing system. The architecture of the trusted core 104 is the same as that of any of the normal cores 102_1 . . . 102_N. For example, all cores have the same hardware design. In an exemplary embodiment, after the power-on of the system, according to the execution of microcode (ucode), the trusted core 104 is selected as indicated through a fuse array. In an exemplary embodiment, the trusted core 104 is reselected through the basic input output system (BIOS), or a microcode extension file (ucode patch). In particular, the trusted core 104 and the normal cores 102_1 . . . 102_N each includes a cryptographic module (which may be implemented by a hardware and software codesign), following China's national cryptographic standards—such as SM2—and providing signature verification capabilities. With the cryptographic modules, the homogeneous dual-computing system is turned on with high security. In the other exemplary embodiments, the aforementioned cryptographic module may implement an asymmetric encryption algorithm (RSA).

In the startup program of the computer 100, the trusted core 104 may operate the cryptographic module to perform firmware verification to authenticate the trusted firmware 110. After the trusted firmware 110 is successfully authenticated, the trusted core 104 runs the trusted firmware 110 to perform basic input and output system (BIOS) verification, to ensure that the master core (BSP) selected from the normal cores 102_1 . . . 102_N operates based on the trusted BIOS 108. In some exemplary embodiments, the cores are provided by the multiple sockets or multiple dies. The trusted BIOS 108 operates to establish links between the sockets or dies. In an exemplary embodiment, the cryptographic module of the trusted core 104 may perform SM2 signature verification according to the microcode (ucode), to verify whether the trusted firmware 110 has been tampered with. In an exemplary embodiment, the cryptographic module of the trusted core 104 may further perform SM2 signature verification for the trusted firmware 110 to perform BIOS verification. In response to the failed BIOS verification, the computer 100 may shut down.

After the link is established, the trusted core 104 operates the trusted firmware 110 to operate a trusted OS loader to load and run the trusted OS 114. Meanwhile, the master core (BSP) runs the trusted BIOS 108 to operate a host operating system loader to authenticate, load, and run the host operating system 112. The homogeneous dual computing system (capable of trusted computing and normal computing), therefore, is securely turned on. In particular, the trusted core 104 and the master core (BSP) communicate with each other through secure interrupts. The trusted operating system 114 and the host operating system 112 also need secure communication, which is achieved by accessing a shared storage space 118 through secure interrupts.

The secure interrupts for secure communication between the trusted core 104 and the master core (BSP) may be secure point-to-point inter-processor interrupts, which is a special inter-processor interrupt (abbreviated as IPI) that is transmitted point-to-point without broadcast announcement.

In an exemplary embodiment, such a secure point-to-point inter-processor interrupt is issued by programming a register ICR of an Advanced Programmable Interrupt Controller (APIC for short). Bits [63:56] of the register ICR are programmed to store identification code "dest core id". When these bits match the core ID of the trusted core 104, the secure point-to-point inter-processor interrupt is designated to be sent to the trusted core 104, and is invisible to normal cores. Such interrupt design results in high security.

The processor may be a single-die processor, wherein the trusted core 104 and the normal cores 102_1 . . . 102_N are fabricated in the same die. Generally, the core with the largest core number in the single die is the trusted core 104 in default. Or, the trusted core 104 may be selected according to the core number designated by the manufacturer.

Figure 2A:
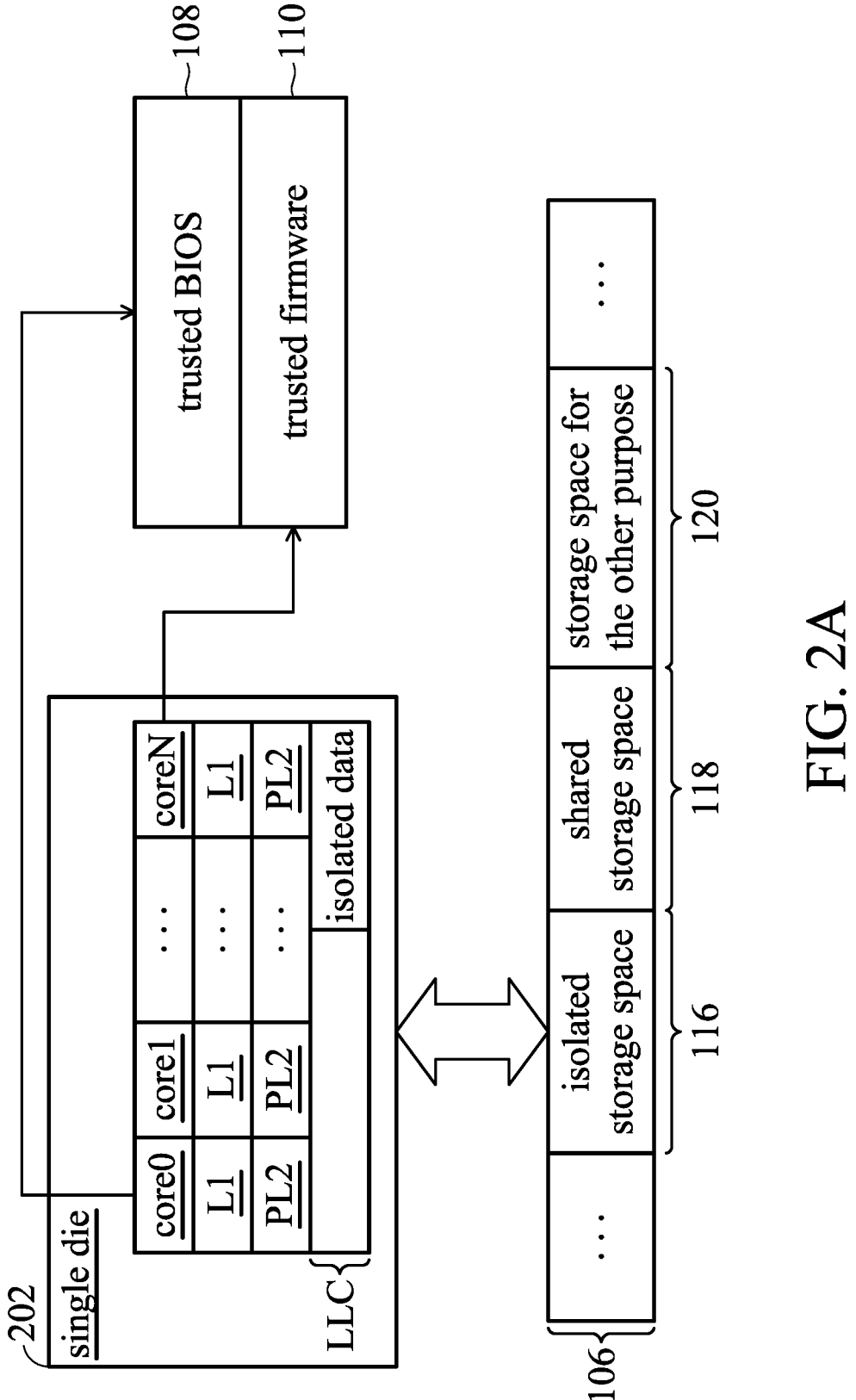
FIG. 2A illustrates a single die homogeneous dual computing system in accordance with an exemplary embodiment of the present disclosure.

FIG. 2A illustrates a homogeneous dual computing system in accordance with an exemplary embodiment of the present disclosure. As shown, a single-die processor 202 has multiple cores core0-coreN. The multiple cores core0~coreN each has an inter-core cache module (e.g., including a first-level cache L1 and a second-level cache PL2), and the different cores core0~coreN share the last-level cache LLC. Through the host interconnection fabric (HIF for short), the cores core0~coreN access the system memory 106. In this example, core coreN is selected as the trusted core 104 to run the trusted firmware 110. The remaining cores core0~coreN−1 are the above-mentioned normal cores 102_# (# is a number), among which core0 is used as the master core (BSP) running the trusted BIOS 108. The isolated data read from the isolated storage space 116 of the system memory 106 and cached into the last level cache LLC should only be accessible to the trusted core coreN. In the following description, a processor with 8 cores is shown for example.

In an exemplary embodiment, another core is selected as the trusted core 104 according to the setting through the BIOS or as indicated in the microcode extension file (ucode patch). In an exemplary embodiment, a model-specific register (MSR) is configured to indicate the trusted core. Each bit corresponds to one core. '1' represents the trusted core, and '0' represents the normal core.

In another exemplary embodiment, the processor is a multi-die processor. Each die has multiple cores; one is tentatively planned as an on-die trusted core and another one is tentatively planned as an on-die master core (BSP). Thus, secure link among the different cores are established. After being linked together, all dies are unified to provide a system trusted core and a system master core. A trusted operating system is loaded onto the system trusted core and run by the system trusted core, and a host operating system is loaded onto the system master core and run by the system master core. Generally, the core with the largest core number in the die with the largest die number is selected as the system trusted core. In another exemplary embodiment, the system trusted core is set (e.g., through the MSR setting) to meet the manufacturer's requirement. The system trusted core and the system master core may be provided by different dies, or may be provided in the same die.

Figure 2B:
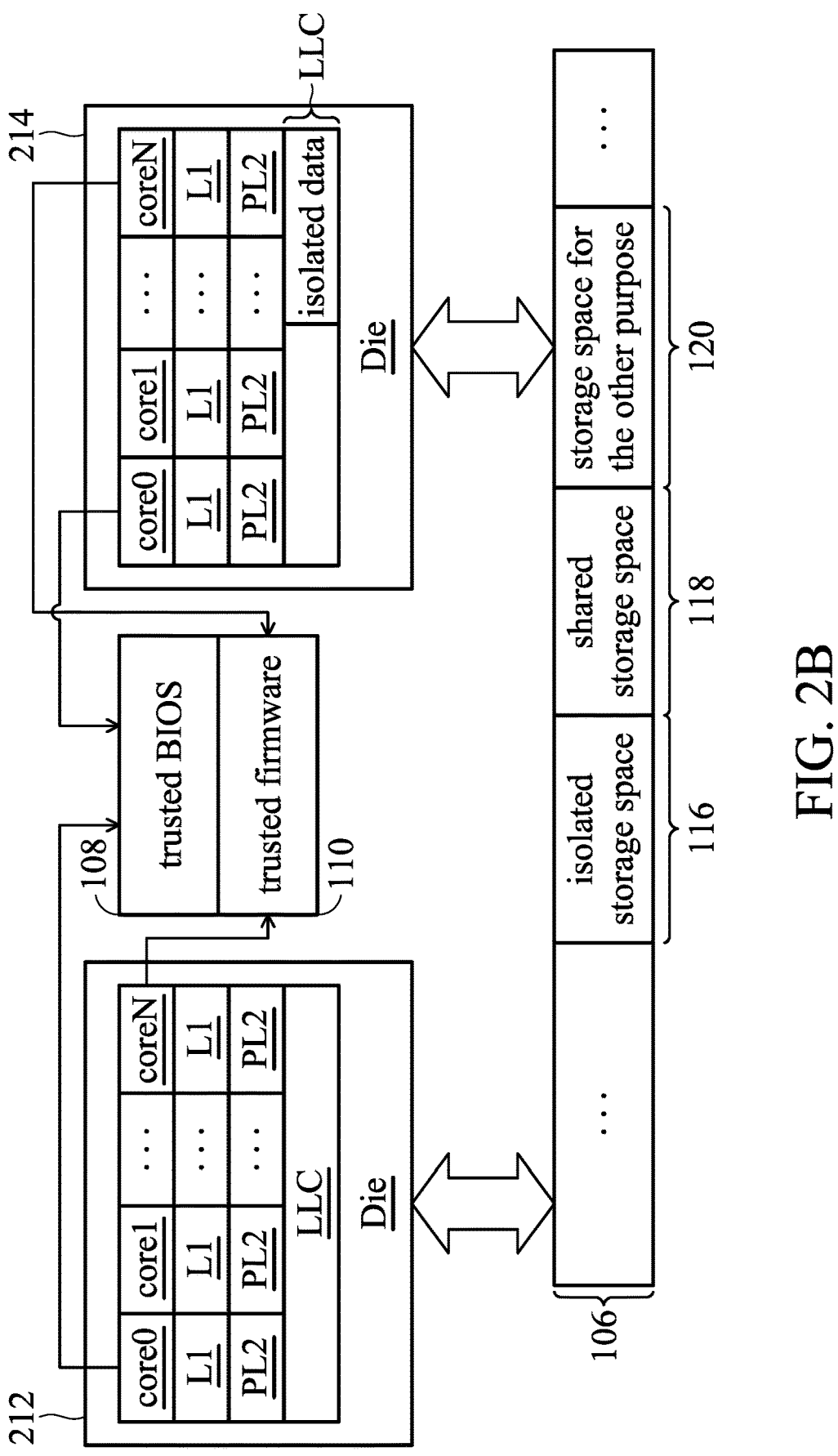
FIG. 2B illustrates a dual-die processor for implementing a homogeneous dual computing system in accordance with an exemplary embodiment of the disclosure.

FIG. 2B illustrates a dual-die processor for implementing a homogeneous dual computing system in accordance with an exemplary embodiment of the disclosure. The dual dies 212 and 214 implementing the processor each have multiple cores core0 . . . coreN. Before being linked together, the different cores of the different dies 212 and 214 each perform firmware verification and BIOS verification. The die 212 temporarily uses its core coreN as its on-die trusted core to realize the verification of the trusted firmware 110 and the trusted basic input and output system 108, and temporarily uses its core core0 as the on-die master core (BSP) to run the trusted basic input and output system 108 to establish the link between dies/sockets. Similarly, the die 214 temporarily uses its core coreN as its on-die trusted core to realize the verification of the trusted firmware 110 and the trusted basic input and output system 108, and temporarily uses its core core0 as the on-die master core (BSP) to run the trusted basic input and output system 108 to establish the link between dies/sockets. In this way, the link between the dies 212 and 214 is established. The core core0 on the die 212 is selected as the system master core to run the trusted BIOS 108 and, accordingly, the cryptographic module in the system master core performs operating system verification on the operating system loaded onto the system master core, so that the system master core runs the host operating system 112 that passes verification. The core coreN on the die 214 is selected as the system trusted core that runs the trusted firmware 110. According to the trusted firmware 110, the system trusted core operates the cryptographic module in the system trusted core to perform operating system verification on the operating system loaded onto the system trusted core, so that the system trusted core runs the trusted operating system 114 that passes verification. As for the core coreN on the die 212 (the temporary trusted core on the die 212 before the link between the dies 212 and 214 is established), and the core0 on the die 214 (the temporary master core on the die 214 before the link between the dies 212 and 214 is established), they are released as the system normal cores. The isolated data read from the isolated storage space 116 of the system memory 106 and cached into the last level cache LLC is only accessible to the system trusted core coreN on the die 214.

Figure 3:
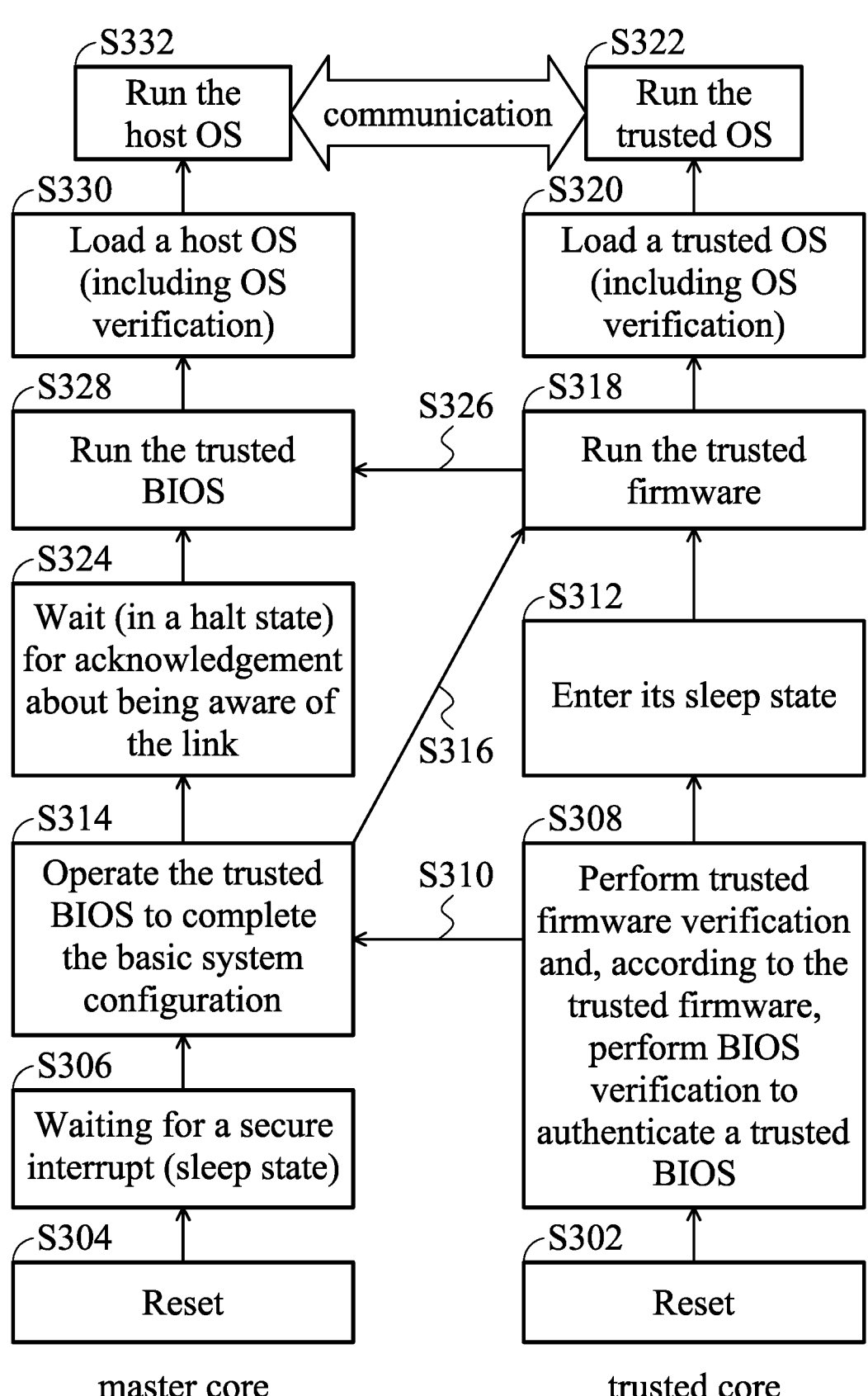
FIG. 3 illustrates a secure boot procedure of a homogeneous dual computing system in accordance with an exemplary embodiment of the disclosure.

FIG. 3 illustrates a secure boot procedure of a homogeneous dual computing system in accordance with an exemplary embodiment of the disclosure. From bottom to top, the secure boot procedure of the trusted core (right column) and the master core (BSP, left column) is shown.

After the computer 100 is powered on, the trusted core is reset (S302), the master core (BSP) is reset (S304), and the other normal cores are reset.

In response to a reset of the trusted core 104 (S302), the trusted core 104 operates while the master core (BSP) and the other normal cores are in their sleep state (S306). In step S308, the trusted core 104 verifies the trusted firmware 110 and, according to the trusted firmware 110, the trusted core 104 performs BIOS verification to verify all system hardware. In an exemplary embodiment, the trusted core 104 verifies the trusted firmware 110 by loading and verifying its signature. In the trusted core 104, the cryptographic module that verifies the trusted firmware and the trusted BIOS follows the China's national cryptographic standard such as SM2, and performs SM2 signature verification to check the firmware signature. If the signature verification fails, the trusted core 104 may assert a flag to force the computer 100 to shut down. In an exemplary embodiment, the trusted core 104 asserts the signal PWRBTN # for more than 4 seconds, to trigger a hardware system management interrupt (HW SMI) and, accordingly, the system is forced to enter the sleep state S5. If the signature verification is successful, it is trusted that what is loaded is indeed the trusted firmware 110. The verification of the trusted BIOS may also be a similar technique. After authentication of the trusted BIOS 108, the procedure proceeds to step S310, in which the trusted core 104 transmits an inter-processor interrupt (such as IPI-INIT, where IPI is the abbreviation of Inter-Processor Interrupt) to securely wake up the master core (BSP)

through the Advanced Programmable Interrupt Controller (APIC for short). After transmitting the inter-processor interrupt, the trusted core 104 enters its sleep state in step S312.

In step S314, the awakened master core (BSP) operates the trusted BIOS 108 to complete the basic configuration of the system, including the pre-link up for establishing links between dies/sockets. Meanwhile, the isolated storage space 116 may be initialized. The master core (BSP) then wakes up the other normal cores, and securely wakes up the trusted core through inter-processor interrupts (e.g., IPI-NMI) in step S316.

In step S318, the awakened trusted core 104 runs the trusted firmware 110. In step S320, the trusted core 104 running the trusted firmware 110 operates a trusted OS loader to load an operating system, and operates the cryptographic module in the trusted core 104 to perform operation system verification. Thus, the trusted core 104 runs the trusted OS 114 (step S322).

As for the master core (BSP), after transmitting a secure inter-processor interrupt (e.g., a specially defined secure inter-processor interrupt, security-IPI, the master core BSP issues to be securely transmitted to the trusted core 104) to the trusted core 104 (S316), the master core (BSP) enters a halt state in the step S324. In step S326, the trusted core 104 running the trusted firmware 110 uses a secure inter-processor interrupt (e.g., an IPI-NMI) to inform that the master core BSP has learned the links between dies/sockets. In step S328, the master core (BSP) runs the trusted BIOS 108. In step S330, the master core (BSP) running the trusted BIOS 108 operates a host operating system loader to load the host operating system 112; wherein the master core (BSP) may use a cryptographic module to execute a verification program to ensure that the loaded host operating system 112 is authenticated. In step S332, the host operating system 112 is run by the normal core. The host operating system 112 and the trusted operating system 114 can communicate with each by accessing the shared storage space 118 (provided on the system memory 106) through secure inter-processor interrupts (e.g., IPI-NMI).

In short, the homogeneous dual computing system includes multiple stages of verification. In step S308, the trusted core 104 performs trusted firmware verification, and then uses the trusted firmware 110 that passes the verification to perform BIOS verification to authenticate the trusted BIOS 108. In step S320, the trusted core 104 operates the trusted firmware 110 to load an operating system and perform operating system verification. Thus, in step S322, the running operating system is indeed the trusted operating system 114. In step S330, the master core (BSP) operates the trusted BIOS 108 to load an operating system and perform operating system verification. Thus, in step S332, the verified host operating system operates to securely startup the system.

In particular, the trusted core 104 and the normal core communicate with each other through secure interrupts. In step S310, the trusted core 104 wakes up the master core (BSP) through an inter-processor interrupt (e.g., an IPI-INIT). In step S316, the master core (BSP) wakes up the trusted core 104 through an inter-processor interrupt (e.g., a security-IPI). In step S326, the trusted core 104 informs the master core (BSP) through an inter-processor interrupt (e.g., IPI-NMI). Furthermore, the running host operating system 112 and trusted operating system 114 (steps S322 and S332) communicate with each other through inter-processor interrupts (e.g., IPI-NMI).

Figure 4:
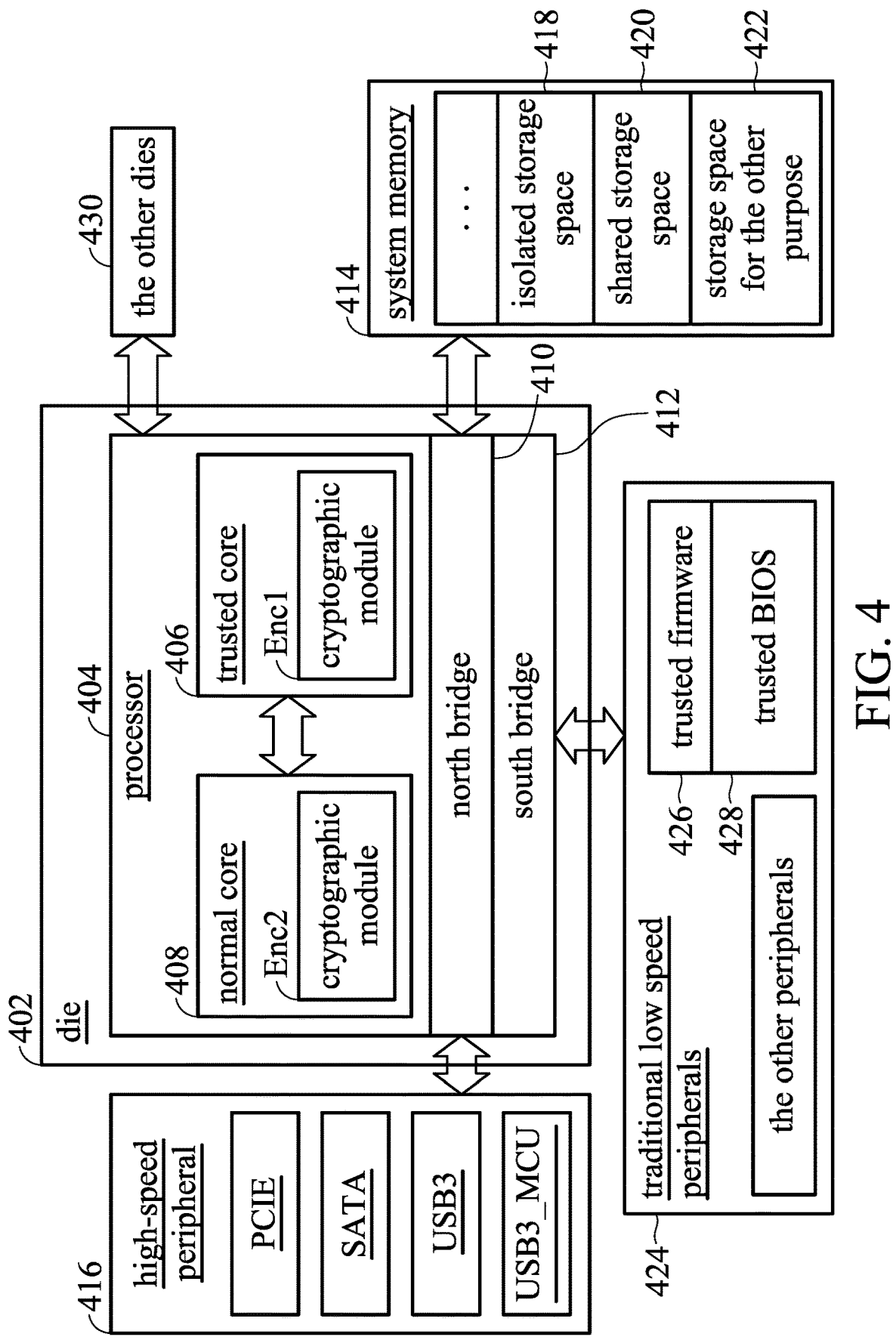
FIG. 4 is a block diagram illustrating hardware of a homogeneous dual computing system in accordance with an exemplary embodiment of the disclosure.

FIG. 4 is a block diagram illustrating hardware of a homogeneous dual computing system in accordance with an exemplary embodiment of the disclosure. The die 402 is implemented as an SoC (System on a Chip), and the processor 404 includes a plurality of cores, one of which is a trusted core 406, and the rest are normal cores (408 is one of the normal cores). A master core (BSP) is selected from the normal cores. The trusted core 406 includes a cryptographic module Enc1 which follows China's national encryption standard, such as SM2. The cryptographic module Enc1 may further include the SM3 and SM4 cryptographic functions. In some examples, the cryptographic module Enc1 includes a true random number generator. In addition, the normal core 408 homogeneous with the trusted core 406 may also has a similar cryptographic module Enc2. The cryptographic modules Enc1 and Enc2 work for the secure booting of the homogeneous dual computing system.

The processor 404 is further equipped with a chipset (including the north bridge 410 and the south bridge 412). The north bridge 410 is provided for high-speed communication, and can link a system memory 414 (such as a DRAM) and various high-speed peripherals 416. The system memory 414 may be planned to provide an isolated storage space 418 (that is exclusive to the trusted core 406 and should be prohibited from being accessed by the normal cores), a shared storage space 420 (for communication between the trusted core 406 and the normal cores), and a storage space 422 for the other purpose. The high-speed peripherals 416 may be high-speed interface devices such as PCIE, SATA, and USB3 devices, or may be a high-speed micro-control unit USB3_MCU; there are also other embodiments. The south bridge 412 may link traditional low speed peripherals 424, including trusted firmware 426 and trusted BIOS 428.

In some exemplary embodiments, the die 402 is further connected to other dies 430, and the processor is a multi-die processor (referring to FIG. 2B).

FIG. 4 shows a trusted computing environment, in which the hardware is planned to provide the complete high-security computing resources (such as the trusted core 406, and the normal core securely operates with the trusted core 406, and the required hardware), and an isolated storage space (such as the isolated storage space 418 provide on the system memory 414). The trusted core 406 and normal cores contained in the same processor with the trusted core 406 form a homogeneous dual computing system (including the aforementioned architectures in FIG. 2A and FIG. 2B). After the aforementioned multi-stage verification performed by the trusted core 406 and the master core (BSP), a trusted computing chain (or, chain of trust) is established, and secure startup is achieved.

The trusted computing chain is established by executing microcode (ucode) to authenticate the trusted firmware, operating the trusted firmware to authenticate the trusted BIOS, and then operating the trusted BIOS to verify the system hardware. The authentication about the trusted operating system and the host operating system further makes the chain of trust more reliable.

The trusted core 406 and the normal core 408 communicate with each other through secure interrupts, and the trusted core 406 further uses an interrupt blocking mechanism to ensure the security of the homogeneous dual computing system. The cryptographic modules (such as cryptographic modules Enc1 and Enc2) of the cores 406 and 408 make the data communicated between the cores is encrypted, so that secure communication is achieved. Malicious programs and abnormal behaviors on the computer will be fully monitored. The computer has security protection and active immunity functions.

Figure 5:
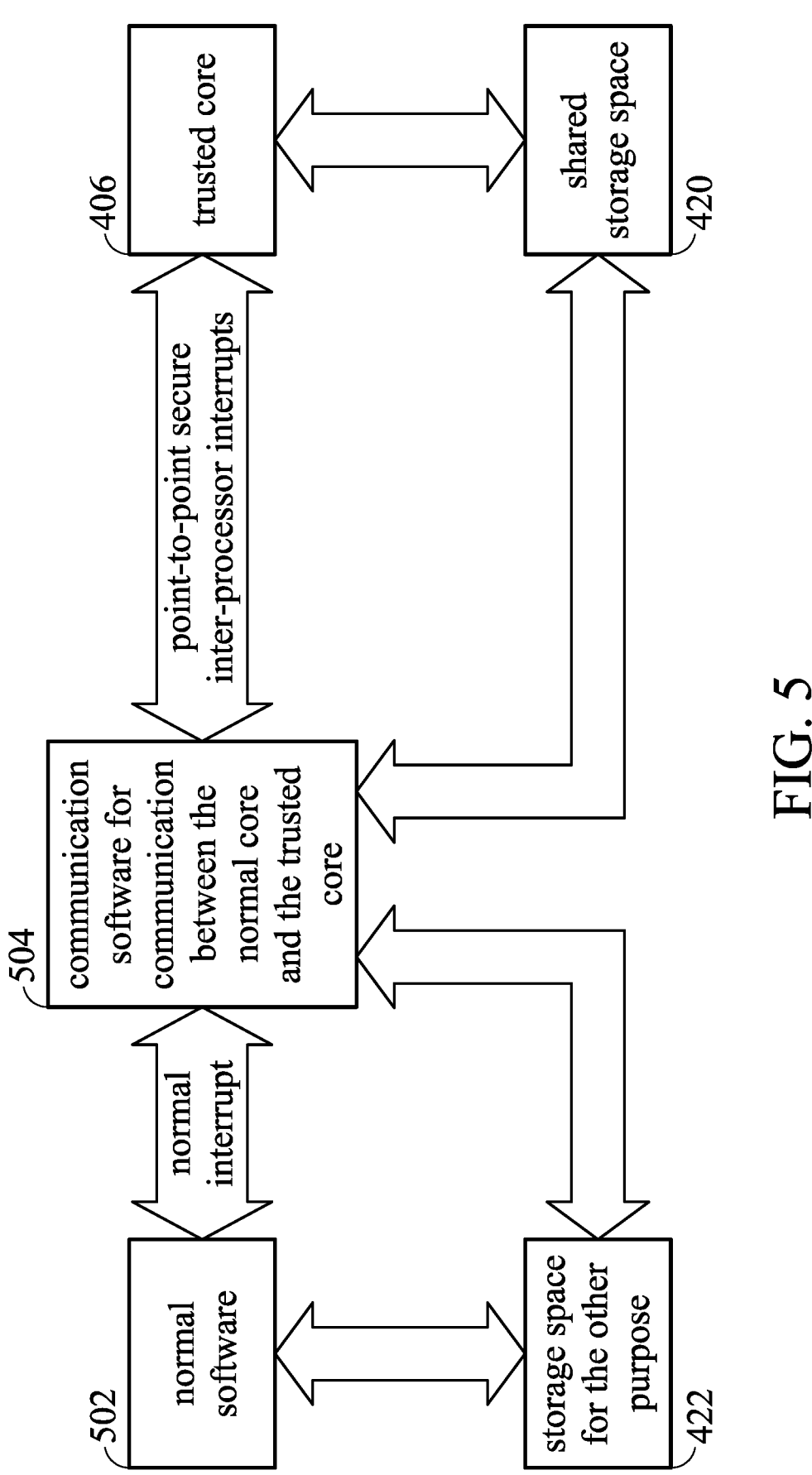
FIG. 5 illustrates a software running architecture for a homogeneous dual computing system in accordance with an exemplary embodiment of the disclosure.

FIG. 5 illustrates a software running architecture for a homogeneous dual computing system in accordance with an exemplary embodiment of the disclosure. The normal core runs normal software 502, and may run communication software 504 (for communication between the normal core 408 and the trusted core 406) to call the trusted core 406 to perform trusted computing. On the normal core 408, the normal software 502 and the communication software 504 may communicate with each other through normal interrupts. The exchanged message may be stored in the shared storage space 420 planned on the system memory 414. The communication software 504 running on the normal core 408 may communicate with the trusted core 406 through secure interrupts (e.g., point-to-point secure inter-processor interrupts, security-IPI), and the exchanged message may be stored in the shared storage space 420 planned on the system memory 414.

In an exemplary embodiment, the exchanged message between the normal software 502 and the communication software 504 may be encrypted and stored in the storage space 422.

Figure 6:
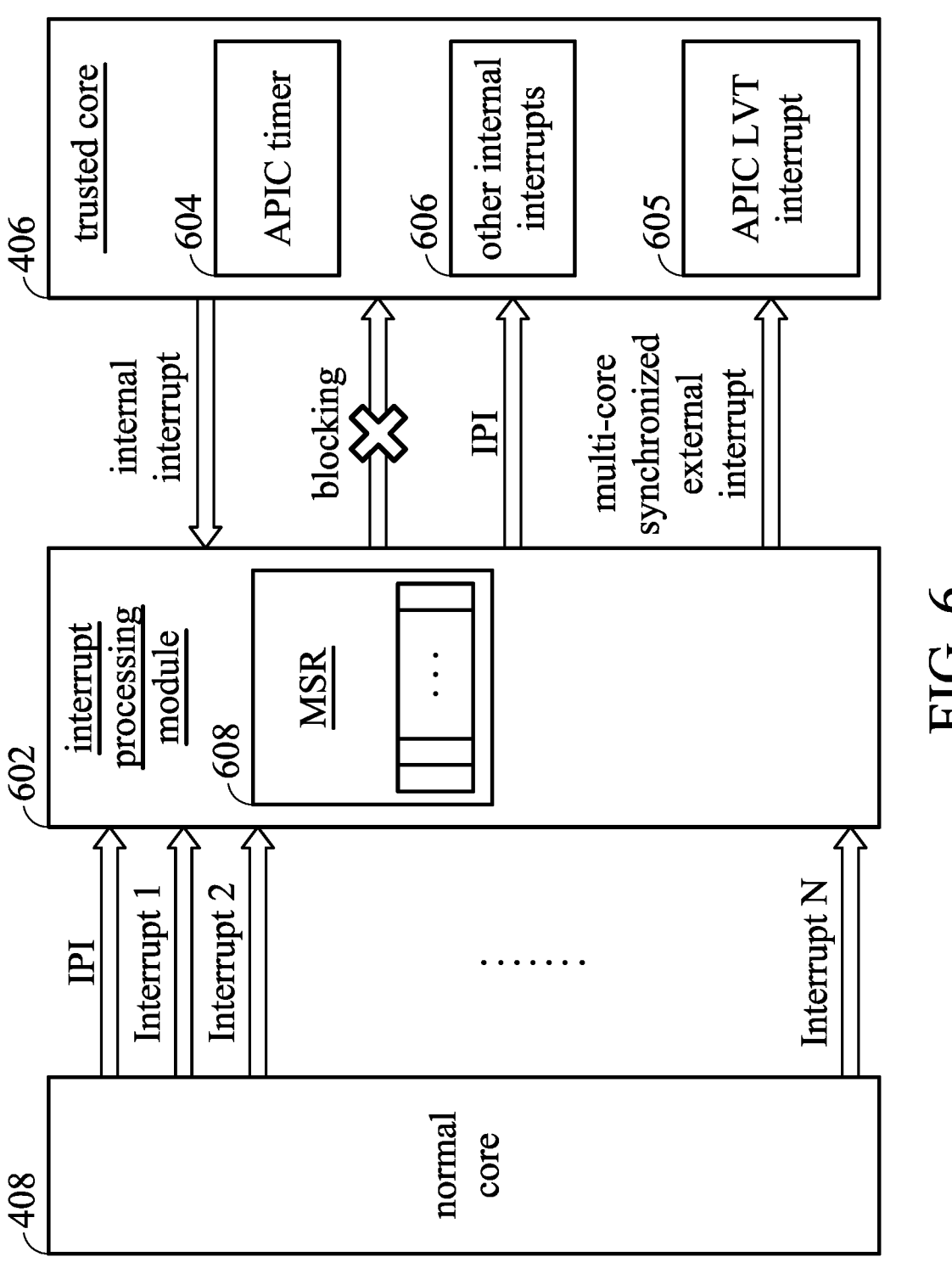
FIG. 6 illustrates the hardware implementing of the secure interruption in accordance with an exemplary embodiment of the disclosure.

FIG. 6 illustrates the hardware implementing of the secure interruption in accordance with an exemplary embodiment of the disclosure. An interrupt processing module 602 is provide on the processor to handle the interrupt the normal core 408 issues to the trusted core 406, and the internal interrupts of the trusted core 406.

The interrupts the normal core 408 issues to the trusted core 406 may be a point-to-point secure inter-processor interrupt IPI (such as the aforementioned security-IPI), and the other various interrupts (interrupt 1, interrupt 2, . . . , interrupt N). These interrupts may be Pin_SMI, Pin_NMI, Pin_INIT, Pin_INTR, A20M, PREQ, broadcast_IPI, MSI, Stop_clk, etc. SMI stands for System Management Interrupt. NMI stands for non-maskable interrupt. INIT stands for Initialization Interrupt. INTR stands for Interrupt Request. broadcast_IPI stands for broadcast inter-processor interrupt. MSI stands for Message Signaled Interrupt. Stop_clk stands for Clock Stop Interrupt.

The trusted core 406 itself has an advanced programmable interrupt timer (APIC timer) 604, an APIC LVT interrupt 605 (where LVT is abbreviated from Local Vector Table), and other internal interrupts 606. The interrupts 604, 605, and 606 are all optional.

A model-specific register (MSR for short) 608 is specially planned in this disclosure. Each bit of the MSR 608 corresponds to one specific interrupt type. The different bit states ("1" or "0") represent blocking or unblocking of the corresponding type of interrupt. The interrupt the normal core 408 issues to the trusted core 406 must be processed by the interrupt processing module 602, and the interrupt processing module 602 refers to the corresponding bit in the MSR 608 to decide whether to block or unblock the interrupt. As shown, what is allowed to be transferred from the normal core 408 to the trusted core 406 is a point-to-point secure inter-processor interrupt IPI, and an external interrupt that requires multi-core synchronization (a multi-core synchronized external interrupt), and the like. By blocking the other interrupts, malicious software is prevented from attacking the trusted core 406 through interrupts. As for the internal interrupts of the trusted core 406, some unnecessary interrupts are blocked, while other internal interrupts are unblocked. In summary, the trusted core 406 is interrupted only by secure interrupts.

In an exemplary embodiment, the MSR 608 is configured by the processor at the startup procedure of the computer.

Based on the aforementioned concept, a method for operating a homogeneous dual computing system is proposed. The method comprises the following steps: planning a processor with multiple cores to provide a trusted core that has an access right to an isolated storage space of a system memory, and a master core which is homogeneous with the trusted core and is one normal core prohibited from accessing the isolated storage space; and, in response to a reset of the trusted core, a cryptographic module of the trusted core may be used to perform firmware verification and BIOS verification, and then the multiple stage verifications may be completed based on the trusted firmware and the trusted BIOS.

While the disclosure has been described by way of example and in terms of the preferred embodiments, it should be understood that the disclosure is not limited to the disclosed embodiments.

What is claimed is:

1. A processor for building a homogeneous dual computing system, comprising:
    a trusted core, having an access right to an isolated storage space of a system memory; and
    a master core, which is homogeneous with the trusted core, and is one normal core prohibited from accessing the isolated storage space;
    wherein:
    the trusted core has a first cryptographic module;
    in response to a reset of the trusted core, the first cryptographic module operates for firmware verification and thereby the trusted core turns on the processor using trusted firmware;
    in response to resetting of all normal cores and the trusted core, the trusted core starts operations and all normal cores go to sleep;
    the trusted core operates the first cryptographic module to perform firmware signature verification to authenticate and run the trusted firmware, and further operates the first cryptographic module to perform basic input and output system verification to authenticate a trusted basic input and output system, and then wakes up the master core; and
    after being woken up, the master core runs the trusted basic input and output system.

2. The processor as claimed in claim 1, wherein:
    after waking up the master core to run the trusted basic input and output system, the trusted core enters a sleep state;
    the trusted core in the sleep state is awakened by the master core after the master core running the trusted basic input and output system establishes a link between sockets or dies; and
    after being awakened by the master core, the trusted core runs the trusted firmware to operate the first cryptographic module to perform operating system verification on an operating system loaded on the trusted core, to authenticate and run a trusted operating system.

3. The processor as claimed in claim 2, wherein:
    after being awakened by the master core to run the trusted firmware, the trusted core informs the master core that the trusted core has learned the link between sockets or dies and, in response to being acknowledged by the trusted core, the master core runs the trusted basic input and output system to operate a second cryptographic module in the master core to perform operating system verification on an operating system loaded onto the master core, to authenticate and run a host operating system.

4. The processor as claimed in claim 3, wherein:

the trusted core issues a secure inter-processor interrupt to safely wake up the master core to run the trusted basic input and output system;

after running the trusted basic input and output system to establish the link between sockets or dies, the master core issues a secure inter-processor interrupt to safely wake up the trusted core to run the trusted firmware; and the trusted core issues a secure inter-processor interrupt to inform the master core that the trusted core has learned the link between sockets or dies.

5. The processor as claimed in claim 4, wherein:

the trusted core running the trusted operating system and the normal core running the host operating system communicate with each other by accessing a shared storage space of the system memory through secure inter-processor interrupts.

6. The processor as claimed in claim 5, further comprising:

an interrupt processing module, blocking or unblocking interrupts the normal cores issue to the trusted core according to interrupt types of the interrupts, wherein the interrupts unblocked by the interrupt processing module including point-to-point secure inter-processor interrupts, and multi-core synchronized external interrupts.

7. The processor as claimed in claim 6, wherein:

according to necessity, local internal interrupts of the trusted core are blocked by the interrupt processing module while other internal interrupts of the trusted core are allowed by the interrupt processing module.

8. The processor as claimed in claim 7, further comprising:

a model-specific register, which is programmed when the processor starts up, to make sure that one bit of the model-specific register corresponds to one interrupt type to indicate whether to block or unblock interrupts of the corresponding interrupt type.

9. The processor as claimed in claim 5, which is a single-die processor, wherein the master core and the trusted core are provided on the same die.

10. The processor as claimed in claim 1, which is a multi-die processor further comprising:

a first die, temporarily planned to provide the trusted core and the master core, so that on the first die, the master core runs the trusted basic input and output system for link establishment;

dies other than the first die, temporarily planned to provide an on-die trusted core and an on-die master core on each die;

each on-die trusted core performs firmware verification and runs verified firmware to perform basic input and output system verification, and each on-die master core runs a verified basic input and output system for link establishment; and after being linked together, all dies are unified to provide a system trusted core and a system master core, wherein a trusted operating system is loaded onto the system trusted core and run by the system trusted core, and a host operating system is loaded onto the system master core and run by the system master core.

11. A method for operating a homogeneous dual computing system, comprising:

planning a processor with multiple cores to provide a trusted core that has an access right to an isolated storage space of a system memory, and a master core which is homogeneous with the trusted core and is a normal core prohibited from accessing the isolated storage space; and in response to a reset of the trusted core, a first cryptographic module of the trusted core is operated to perform firmware verification and thereby the trusted core turns on the processor using trusted firmware;

wherein:

in response to a reset of all normal cores and the trusted core, the trusted core starts operations and all normal cores go to sleep;

the trusted core operates the first cryptographic module to perform firmware signature verification to authenticate and run the trusted firmware, and further operates the first cryptographic module to perform basic input and output system verification to authenticate a trusted basic input and output system, and then wakes up the master core; and after being woken up, the master core runs the trusted basic input and output system.

12. The method as claimed in claim 11, wherein:

after waking up the master core to run the trusted basic input and output system, the trusted core enters a sleep state;

the trusted core in the sleep state is awakened by the master core after the master core running the trusted basic input and output system establishes a link between sockets or dies; and after being awakened by the master core, the trusted core runs the trusted firmware to operate the first cryptographic module to perform operating system verification on an operating system loaded on the trusted core, to authenticate and run a trusted operating system.

13. The method as claimed in claim 12, wherein:

after being awakened by the master core to run the trusted firmware, the trusted core informs the master core that the trusted core has learned the link between sockets or dies and, in response to being acknowledged by the trusted core, the master core runs the trusted basic input and output system to operate a second cryptographic module in the master core to perform operating system verification on an operating system loaded onto the master core, to authenticate and run a host operating system.

14. The method as claimed in claim 13, wherein:

the trusted core issues a secure inter-processor interrupt to safely wake up the master core to run the trusted basic input and output system;

after running the trusted basic input and output system to establish the link between sockets or dies, the master core issues a secure inter-processor interrupt to safely wake up the trusted core to run the trusted firmware; and the trusted core issues a secure inter-processor interrupt to inform the master core that the trusted core has learned the link between sockets or dies.

15. The method as claimed in claim 14, wherein:

the trusted core running the trusted operating system and the normal core running the host operating system communicate with each other by accessing the shared storage space of the system memory through secure inter-processor interrupts.

16. The method as claimed in claim 15, further comprising:

blocking or unblocking interrupts the normal cores issue to the trusted core according to interrupt types of the interrupts, wherein point-to-point secure inter-processor interrupts and multi-core synchronized external interrupts are unblocked.

17. The method as claimed in claim 16, wherein:

according to necessity, local internal interrupts of the trusted core are blocked while other internal interrupts of the trusted core are allowed.

18. The method as claimed in claim 17, further comprising:

programming a model-specific register when the processor starts up, to make sure that each bit of the model-specific register corresponds to one interrupt type to indicate whether to block or unblock interrupts of the corresponding interrupt type.

19. The method as claimed in claim 15, wherein:

the processor is a single-die processor; and the master core and the trusted core are provided on the same die.

20. The method as claimed in claim 11, wherein:

the processor is a multi-die processor;

a first die of the multi-die processor is temporarily planned to provide the trusted core and the master core, so that on the first die, the master core runs the trusted basic input and output system for link establishment;

on the multi-die processor, dies other than the first die are temporarily planned to provide an on-die trusted core and an on-die master core on each die;

each on-die trusted core performs firmware verification and runs verified firmware to perform basic input and output system verification, and each on-die master core runs a verified basic input and output system for link establishment; and after being linked together, all dies are unified to provide a system trusted core and a system master core, wherein a trusted operating system is loaded onto the system trusted core and run by the system trusted core, and a host operating system is loaded onto the system master core and run by the system master core.

* * * * *